United States Patent
Schatzberger et al.

(10) Patent No.: US 8,022,749 B2
(45) Date of Patent: Sep. 20, 2011

(54) CIRCUIT ARRANGEMENT FOR VOLTAGE SUPPLY AND METHOD

(75) Inventors: Gregor Schatzberger, Graz (AT); Andreas Wiesner, Edelschrott (AT)

(73) Assignee: austriamicrosystems AG, Unterpremstätten (AT)

( * ) Notice: Subject to any disclaimer, the term of this patent is extended or adjusted under 35 U.S.C. 154(b) by 319 days.

(21) Appl. No.: 12/223,107

(22) PCT Filed: Jan. 18, 2007

(86) PCT No.: PCT/EP2007/000440
§ 371 (c)(1),
(2), (4) Date: Mar. 11, 2009

(87) PCT Pub. No.: WO2007/082756
PCT Pub. Date: Jul. 26, 2007

(65) Prior Publication Data
US 2011/0050325 A1 Mar. 3, 2011

(30) Foreign Application Priority Data
Jan. 19, 2006 (DE) .......... 10 2006 002 712

(51) Int. Cl.
G05F 1/10 (2006.01)
G05F 3/02 (2006.01)
(52) U.S. Cl. ......... 327/536; 327/537; 327/539; 323/313
(58) Field of Classification Search .......... 327/148, 327/157, 530, 534–543, 546; 363/59, 60; 323/312–317
See application file for complete search history.

(56) References Cited

U.S. PATENT DOCUMENTS 5,168,174 A * 12/1992 Naso et al. ............. 327/540
5,264,782 A    11/1993 Newton
5,365,121 A    11/1994 Morton et al.
(Continued)

FOREIGN PATENT DOCUMENTS
EP   0 862 260    9/1998
(Continued)

OTHER PUBLICATIONS

I. Motta et al., "High-Voltage Management in Single-Supply CHE NOR-Type Flash Memories", Apr. 2003, Proceedings of the IEEE, New York, NY, XP0110655139.
(Continued)

*Primary Examiner* — Lincoln Donovan
*Assistant Examiner* — Brandon S Cole
(74) *Attorney, Agent, or Firm* — Cozen O'Connor

(57) ABSTRACT

The circuit arrangement for the supply of voltage comprises a control arrangement (2), a charge pump (14), a comparator (25) and a ramp signal generator (30). A power supply voltage (Vdd) can be fed to the input of the charge pump (14). The input of the charge pump (14) is coupled to a first output (5) of the control arrangement (2), and comprises an output (17) for the supply of an output voltage (VHv). A first input (26) of the comparator (25) is coupled to the output (17) of the charge pump (14), while the output is coupled to a first input (3) of the control arrangement (2) in order to supply a comparator signal (Vc). The input of the ramp signal generator (30) is connected to a second output (6) of the control arrangement (2), while its output is connected to a second input (27) of the comparator (25) in order to deliver a reference output voltage (Vref_out).

13 Claims, 8 Drawing Sheets

U.S. PATENT DOCUMENTS

| | | | |
|---|---|---|---|
| 5,483,486 | A | 1/1996 | Javanifard et al. |
| 5,671,179 | A | 9/1997 | Javanifard |
| 5,917,313 | A * | 6/1999 | Callahan, Jr. .................. 323/288 |
| 5,926,409 | A | 7/1999 | Engh et al. |
| 5,945,870 | A | 8/1999 | Chu et al. |
| 6,310,789 | B1 | 10/2001 | Nebrigic et al. |
| 6,456,153 | B2 | 9/2002 | Buck et al. |
| 6,480,436 | B2 | 11/2002 | Confalonieri et al. |
| 6,566,847 | B1 | 5/2003 | Chou et al. |
| 6,717,458 | B1 | 4/2004 | Potanin |
| 6,774,709 | B2 | 8/2004 | Castaldo et al. |
| 6,774,710 | B2 | 8/2004 | Li |
| 6,903,599 | B2 | 6/2005 | Chen et al. |
| 6,980,047 | B1 | 12/2005 | Kuo |
| 7,002,381 | B1 | 2/2006 | Chung |
| 2003/0218453 | A1 | 11/2003 | Castaldo et al. |
| 2006/0028854 | A1 | 2/2006 | Kawai |

FOREIGN PATENT DOCUMENTS

| | | |
|---|---|---|
| EP | 0 862 270 | 9/1998 |
| EP | 1 429 222 | 12/2002 |
| JP | 2003-164142 | 6/2003 |

OTHER PUBLICATIONS

H. Shafeeu et al., "An improved tuning technique for switched capacitor filters", Circuits and Systems, 1994, ISCAS, IEEE International Symposium in London, vol. 2, No. 30. pp. 629-632, May 1994.

M. Lubaszewski et al., "A built-in multi-mode stimuli generator for analogue and mixed-signal testing", Integrated Circuit Design, 1998, XI Brazilian Symposium in Brazil, IEEE Computer Society, pp. 175-178, Sep. 30, 1998.

Robert Pease, "The Design of Band-Gap Reference Circuits: Trials and Tribulations", IEEE Proceedings of the 1990 Bipolar Circuits and Technology Meeting, pp. 1-6, Sep. 17-18, 1990.

* cited by examiner

CIRCUIT ARRANGEMENT FOR VOLTAGE SUPPLY AND METHOD

RELATED APPLICATIONS

This is a U.S. national stage under 35 USC 371 of application No. PCT/EP2007/000440 filed on 18 Jan. 2007.

This patent application claims the priority of German Patent Application no. 10 2006 002 712.4 filed Jan. 19, 2006 the entire content of which is hereby incorporated by reference.

FIELD OF THE INVENTION

The present invention concerns a circuit arrangement for the supply of voltage, a memory component with the circuit arrangement for the supply of voltage, an application of the circuit arrangement and a method for operating a circuit arrangement for the supply of voltage.

BACKGROUND OF THE INVENTION

Circuit arrangements for the supply of voltage can be used to operate memory components. Circuit arrangements of this type can, in particular, be used for non-volatile semiconductor memories. A high voltage may be necessary in order to program and/or delete non-volatile memory cells. The service life of a non-volatile memory component can depend on the rate of rise of the programming and deletion voltage.

Document U.S. Pat. No. 6,456,153 B2 describes an arrangement for the supply of voltage. The arrangement comprises a charge pump followed by a feedback circuit with a voltage divider.

Document U.S. Pat. No. 5,945,870 concerns a circuit for controlling the rate of rise of voltage in a high-voltage generator circuit that incorporates a charge pump. The rise in the voltage is controlled by an oscillator frequency that is supplied to the charge pump.

Document U.S. Pat. No. 6,903,599 B2 concerns an amplifier for the production of a comparative signal, in which the amplifier is coupled to a negative charge pump by means of an oscillator.

Document U.S. Pat. No. 6,774,710 B2 describes a charge pump control system. The output of the charge pump is coupled to an input of a comparator. The comparator, in turn, is connected to a number of inputs of the charge pump through an oscillator and a clock generator.

Document U.S. Pat. No. 6,774,709 B2 describes a circuit for the control of a charge pump. The circuit incorporates a voltage divider that provides a fraction of an output voltage from the charge pump, and the comparator. A fraction of the output voltage, a reference voltage, and a filtered fraction of the output voltage are supplied to the input of the comparator.

Document U.S. Pat. No. 6,566,847 B1 presents a control circuit for a charge pump; the circuit incorporates a constant current generator. The current from the constant current generator is divided between a current-controlled oscillator and a further current generator. A rise in an output voltage from the charge pump results in a reduction in the current that is supplied to the current-controlled oscillator. This causes a drop in a clock frequency that is supplied to the charge pump, and thus to a reduction in the output voltage.

Document U.S. Pat. No. 6,480,436 B2 is concerned with a semiconductor memory having a matrix of memory cells. A charge pump is associated with the matrix of memory cells.

Document U.S. Pat. No. 5,483,486 presents a charge pump that is preceded by a control circuit. An output voltage from the charge pump is supplied through a divider circuit to an input of a voltage-controlled oscillator. A reference voltage is supplied to a further input of the voltage-controlled oscillator. At the output, the voltage-controlled oscillator is connected to a control input of the charge pump.

SUMMARY OF THE INVENTION

One object of the present invention is to provide a circuit arrangement for the supply of voltage, a memory component associated with the circuit arrangement for the supply of voltage, and a method for the operation of a circuit arrangement for the supply of voltage, in such a way that the gradient with which the output voltage rises is controlled.

According to one aspect of the invention, the circuit arrangement comprises a control arrangement, a charge pump, a comparator, and a ramp signal generator. The charge pump has a first input, a second input, and an output. The second input to the charge pump is coupled to a first output from the control arrangement. The comparator has a first input, a second input, and an output. The first input to the comparator is coupled to an output from the charge pump. The output of the comparator is connected to a first input of the control arrangement. The input of the ramp signal generator is connected to a second output of the control arrangement, while an output is connected to the second input of the comparator.

A supply voltage can be fed to the first input of the charge pump. The charge pump is designed to provide an output voltage at the output. The output voltage, or a voltage derived from it, is supplied to the first input of the comparator. The comparator is designed to output a comparator signal at its output that depends on a comparison between the two voltages at the first and second inputs. From the output of the comparator, the comparator signal is supplied to the first input of the control arrangement. The oscillator is driven by the control arrangement in a way that depends on the comparator signal. The ramp signal generator is driven by the control arrangement, and is designed to provide a reference output voltage at the ramp signal generator output. The reference output voltage is fed to the second input of the comparator.

A closed control loop comprising the control arrangement, the charge pump, and the comparator is thereby advantageously formed. By means of the ramp signal generator and of the following comparator, the gradient with which the output voltage rises is favourably controlled.

In a further development, the ramp signal generator provides a reference output voltage with a value that rises over time. The ramp signal generator can here be designed in such a way that the reference output voltage takes the form of a ramp starting at zero volts.

In one embodiment, the ramp signal generator can comprise a low-pass filter, whose output constitutes the output of the ramp signal generator. The low-pass filter favourably avoids a rapid rise in the reference output voltage.

In one embodiment, the low-pass filter is realized in the form of a passive low-pass filter, comprising a resistor and a capacitor.

In one favourable embodiment, the low-pass filter comprises a switched-capacitor circuit. The switched-capacitor circuit can exhibit an adjustable low-pass characteristic. The low-pass filter is favourably implemented in the form of an active filter. The area required for a low-pass filter implemented by means of a switched-capacitor circuit is favourably smaller than that of a passive low-pass filter comprising a resistor and a capacitor. The use of a resistor, which usually has a high resistance value and requires a large area, can favourably be avoided.

The switched-capacitor circuit can be implemented as a second order switched-capacitor filter. Favourably, the switched-capacitor circuit is implemented as a first order switched-capacitor filter.

The ramp signal generator can comprise a drive oscillator whose output is coupled to the low-pass filter. The control oscillator serves to provide a drive signal with which the switched-capacitor circuit can be operated.

In an alternative implementation, the ramp signal generator comprises an integrator prior to the output of the ramp signal generator. Favourably, an output of the integrator forms the output of the ramp signal generator. Integrating a voltage or current signal yields a rise in the output reference voltage.

In a further development, the ramp signal generator has a bandgap circuit. A bandgap circuit is also referred to as a bandgap reference circuit. In a favourable embodiment, an output of the bandgap circuit is connected to an input of the low-pass filter. The bandgap circuit can be designed to provide a direct voltage with a rectangular waveform that is transformed by means of the low-pass filter into a reference output voltage that rises as a ramp. In an alternative embodiment, the output of the bandgap circuit is connected to an input of the integrator. The bandgap circuit can here be designed to output a constant current that is transformed by means of the integrator into the rising reference output voltage.

In a further development, the circuit arrangement comprises an oscillator that drives the charge pump. The oscillator provides an oscillator signal at its output. In one embodiment, an output of the oscillator is connected to an input of the control arrangement. In this embodiment, the control arrangement passes the oscillator signal on to the charge pump in a way that depends on the comparator signal. In this way, the oscillator signal is passed on by the control arrangement in a way that, favourably, is adjusted according to the comparator signal.

In another embodiment, the oscillator is connected between the first output of the control arrangement and the charge pump. The oscillator can thus be connected directly to the charge pump. In this embodiment, the oscillator can favourably be switched on and off by the control arrangement. This permits a higher efficiency to be achieved in comparison with a circuit arrangement in which the oscillator operates continuously.

The oscillator can have a ring oscillator structure incorporating inverter stages connected one after another. In one embodiment, the oscillator comprises a switch with which the oscillator can be deactivated. In one further development the oscillator is designed in such a way that it consumes no energy when it is not active.

In one further development, the oscillator provides the oscillator signal in a way that depends on the temperature. In this way, the oscillator frequency can also rise when the temperature rises. In this way it is favourably possible to compensate for the higher energy consumption of a CMOS circuit at higher temperature by raising the oscillator frequency.

The oscillator frequency can be adjusted by means of a control current. Due to an adjustable temperature-dependency of the control current, the oscillator frequency also exhibits temperature dependency.

Signals that are temperature dependent and that are almost independent of temperature can be accessed at the output of the bandgap circuit. A signal that is almost independent of temperature can be a current, or may take the form of a voltage. The output of the bandgap circuit can be connected to an input of the oscillator in order to supply the temperature-dependent signal. The oscillator signal thus favourably exhibits a higher oscillator frequency at higher temperatures.

In one further development, the circuit arrangement includes a bypass circuit, an input of which is connected with the first input of the charge pump, and an output of which is connected to the output of the charge pump. The supply voltage can be fed to the input of the bypass circuit. The bypass circuit is designed to supply the input voltage as the output voltage of the circuit arrangement. The charge pump can thus favourably be bypassed, and the supply voltage delivered as the output voltage of the circuit arrangement. This can be used to provide the supply voltage to an electrical load that can be coupled to the output voltage of the circuit arrangement.

The bypass circuit can comprise a switch that connects the input to the output of the bypass circuit. The output of the control arrangement can be connected to a control inputs of the bypass circuit, and thereby to a control input of the switch. In one embodiment, the switch in the bypass circuit consists of a transistor. The transistor is favourably implemented as a metal-oxide-semiconductor field-effect-transistor. In one embodiment it is possible for the oscillator to be switched off during bypass operation.

The charge pump can have a series circuit, comprising a coil and a switch to which the supply voltage can be connected. The charge pump can, furthermore, have a diode that couples a tap between the coil and the switch to the output of the charge pump. A control input to the switch can be connected to the oscillator to supply the oscillator signal to the switch. When the switch is closed, the current through the inductor rises. On opening the switch a high-voltage develops, and this is passed through the diode to the output of the charge pump.

In an alternative implementation, the charge pump comprises a transformer to transform the supply voltage.

In one particularly favourable embodiment, the charge pump is implemented in the form of a Dickson charge pump, and comprises diodes and capacitors that are switched over in sequence. The charge pump can utilizes several clock phases, and therefore be more efficient. The charge pump can be implemented as a down-converter, or, preferably, as an up-converter. An advantage of this implementation is that neither a coil nor a transformer are required for voltage conversion.

An implementation of the circuit arrangement can be realized on a semiconductor chip.

In accordance with one aspect of the invention, a memory component comprises a circuit arrangement for voltage supply, as described above, together with an array of memory cells. The memory cells can be implemented as non-volatile memory cells.

An implementation of the memory component can be realized on a semiconductor chip.

The circuit arrangement can be used to supply the voltage for a non-volatile memory component. The circuit arrangement can be used to power an Electrically Erasable Programmable Read-Only Memory, or EEPROM. For reading, the charge pump of an EEPROM can be deactivated, and can be bridged by the bypass circuit. When the EEPROM is in write mode, the charge pump can be activated, and the output voltage can have a higher value than the supply voltage.

A method according to an aspect of the invention for operating the circuit arrangement for the supply of voltage includes the following steps: A reference output voltage adopts a rising value, initially, for instance, of zero volts. The reference output voltage is compared with a fraction of the voltage at the output of the charge pump. If the magnitude of the divided voltage is smaller than the magnitude of the reference output voltage, the charge pump is activated. If the magnitude of the divided voltage is greater than or equal to the magnitude of the reference voltage, the charge pump is switched off.

In this way the charge pump is thus favourably deactivated by the slowly rising reference output voltage if the output voltage from the charge pump undergoes a faster rise than has been set.

In one embodiment, the reference output voltage is increased in accordance with a ramp function. The reference output voltage can here be generated by applying low-pass filtering to a reference voltage by means of a switched-capacitor circuit.

In one favourable embodiment, the reference output voltage does not begin again from the start of the ramp after an interruption in the supply voltage. In accordance with the favourable embodiment, the ramp is only provided once, when switching on. The reference output voltage favourably does not fall in response to an interruption in the supply voltage. The reference output voltage favourably remains at a constant value if the supply voltage is interrupted.

In summary, the disclosed embodiments have the following advantages:

a rise in the output voltage from a charge pump is slowed, and the rise function of the output voltage can be adjusted by means of a ramp signal generator.

BRIEF DESCRIPTION OF THE DRAWINGS

Several example embodiments of the invention are disclosed with the aid of the figures. Components that have the same function or effect are given the same reference codes. To the extent to which parts of the circuit or components have corresponding functions, their description is not repeated for every one of the following figures.

DETAILED DESCRIPTION OF THE DRAWINGS

Figure 1A:
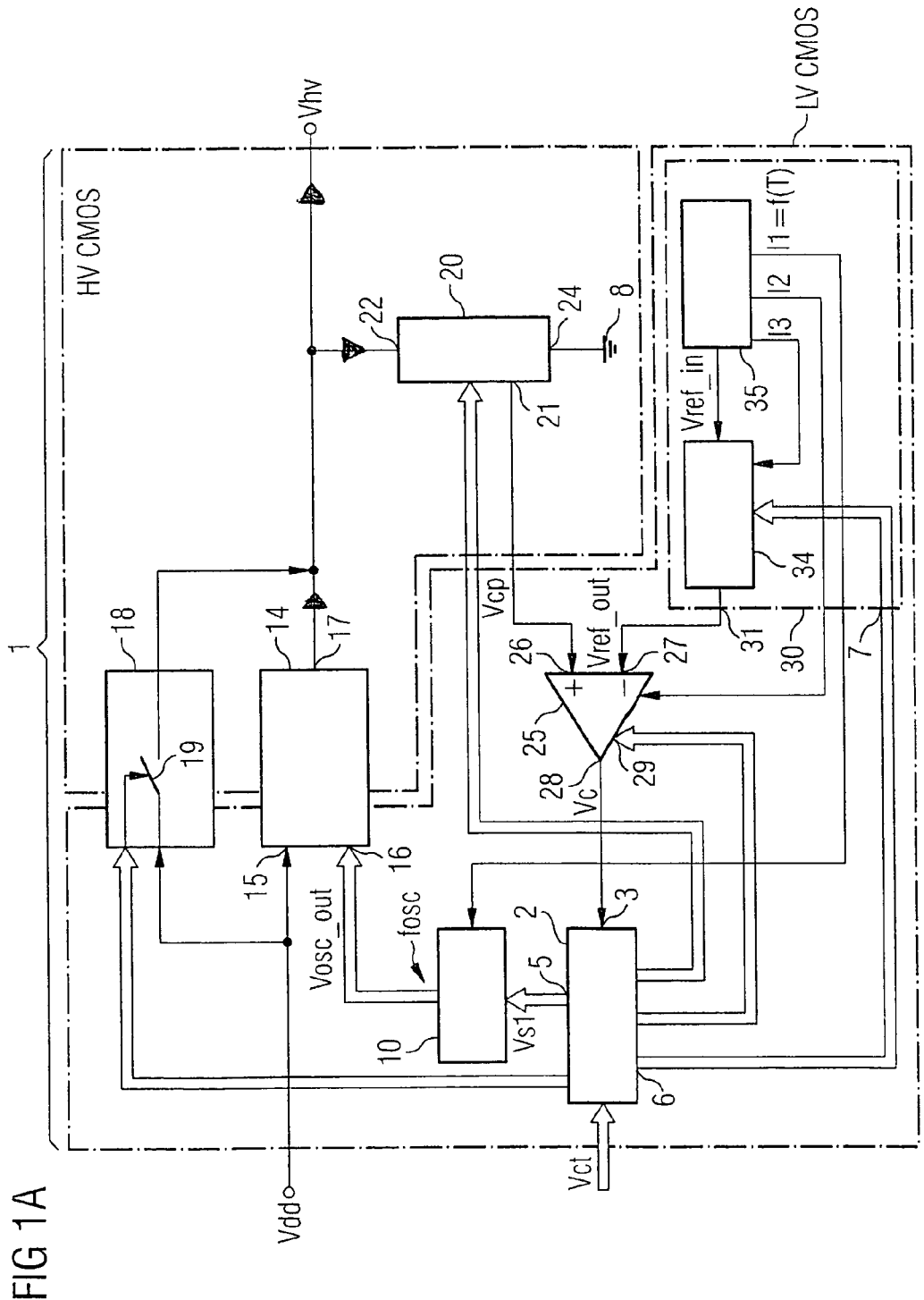
FIGS. 1A and 1B each illustrate examples of circuit arrangements for the supply of voltage.

FIG. 1A illustrates an example of an embodiment of a circuit arrangement 1 for the supply of voltage comprising a charge pump 14 that is followed by a voltage divider 20, a comparator 25, a control arrangement 2, and an oscillator 10. The circuit arrangement 1 also contains a bypass circuit 18 and a ramp signal generator 30.

Control arrangement 2 is a logic circuit. One embodiment of the logic circuit comprises a flip flop and logic gates arranged to control the oscillator 10 so that the oscillator generates its signal with complete periods, thereby avoiding the generation of spikes.

A first output 5 of the control arrangement 2 is connected to the oscillator 10. The output of the oscillator 10 is connected to a second input 16 of the charge pump 14. The voltage divider 20 is included between a first output 17 of the charge pump 14 and a reference potential terminal 8. A tap 21 in the voltage divider 20 is connected to a non-inverting input 26 of the comparator 25. An output 31 of the ramp signal generator 30 is connected to an inverting input 27 of the comparator 25. An output 28 of the comparator 25 is connected to a first input 3 of the control arrangement 2. The output of the control arrangement 2 is coupled to a control input 29 of the comparator 25. Similarly, the output of the control arrangement 2 is coupled to a control input of the voltage divider 20.

The output of the control arrangement 2 is also connected to a control input of the bypass circuit 18, which has a switch 19. A control terminal of the switch 19 is coupled to the control input of the bypass circuit 18. An input to the bypass circuit 18 is connected to a first input 15 of the charge pump 14, while its output is connected to the output 17 of the charge pump 14.

The ramp generator circuit 30 comprises a bandgap circuit 35 and an integrator 34 that follows the bandgap circuit 35. Bandgap circuit 35 operates on the well known Bandgap Reference principle which has long been well known. See, for example, Robert Pease, "The Design of Band-Gap Reference Circuits: Trials and Tribulations", IEEE Proceedings of the 1990 Bipolar Circuits and Technology Meeting, Sep. 17-18, 1990, the content of which is hereby incorporated by reference. An output 31 from the integrator. 34 is connected to the inverting input 27 of the comparator 25. A second output 6 of the control arrangement 2 is coupled through input 7 of the ramp generator circuit 30 to a control input of the integrator 34. The output of the bandgap circuit 35 is connected to the oscillator 10 to supply a first current I1, with the comparator 25 for supply of the second current I2, and with the integrator 34 for the supply of a reference voltage Vref_in and of a third current I3.

A power voltage Vdd is supplied to the circuit arrangement 1 and is passed to the first input 15 of the charge pump and to the input of the bypass circuit 18 within the circuit arrangement 1. An output voltage Vhv is made available at an output of the circuit arrangement, and is delivered to output 17 when the charge pump 14 is in an operating state. In a bypass mode, the bypass circuit 18 supplies the power voltage Vdd as the output voltage Vhv.

The voltage divider 20 is designed to take a fraction of the output voltage Vhv and to provide a divided voltage Vcp. The divided voltage Vcp is passed to the non-inverting input 26 of the comparator 25. At the output of the bandgap circuit 35, the first, second and third currents I1, I2 and I3 can be accessed, as can the reference voltage Vref_in. The third current I3 is passed to the integrator 34. At its output, the integrator 34 provides a reference output voltage Vref_out, obtained by integrating the third current I3. The first current I1 is supplied by the bandgap circuit 35 to the oscillator 10. The first current I1 depends on temperature, and the oscillator 10 can therefore be designed to provide a temperature-dependent oscillator signal Vosc_out. The second current I2 is supplied by the bandgap circuit 35 to the comparator 25. The reference voltage Vref_in is fed from the bandgap circuit 35 to the integrator 34.

The comparator 25 generates a comparator signal Vc in accordance with a comparison between the divided voltage Vcp and the reference output voltage Vref_out. This can be accessed at the output 28 of the comparator 25, and is passed to the first input 3 of the control arrangement 2. An external control signal Vct is an enable signal that starts and stops the generation of supply voltage Vhv by circuit arrangement 1. Depending on the comparator signal Vc and on the external control signal Vct that is fed to the control arrangement 2, the control arrangement 2 generates a first control signal Vs1 that is passed to the oscillator 10. According to the first control signal Vs1, the oscillator 10 provides an oscillator signal Vosc_out at its output with an oscillator frequency of fosc. The charge pump 14 provides the output voltage Vhv in accordance with the pulses of the oscillator signal Vosc_out.

The circuit arrangement 1 can be divided into a high-voltage CMOS part, HV CMOS, and a low-voltage CMOS part, LV CMOS. The high-voltage CMOS part, HV CMOS, comprises the voltage divider 20 and parts of the charge pump 14, as well as the bypass circuit 18. The low voltage CMOS part, LV CMOS, comprises the control arrangement 2, the oscillator 10, the ramp signal generator 30, the comparator 25, parts of the charge pump 14 and parts of the bypass circuit 18.

In this way the ramp signal generator 30 is favourably used to create a rising reference output voltage Vref_out, that allows the charge pump 14 to generate the output voltage Vhv with an adjustable rate of rise. Because of the temperature-dependency of the first current I1, the oscillator frequency fosc has a higher value at a higher temperature. The bypass circuit 18 can favourably be used to bridge the charge pump 14, so that in bypass mode the supply voltage Vdd is present at the output of the circuit arrangement 1.

Figure 1B:
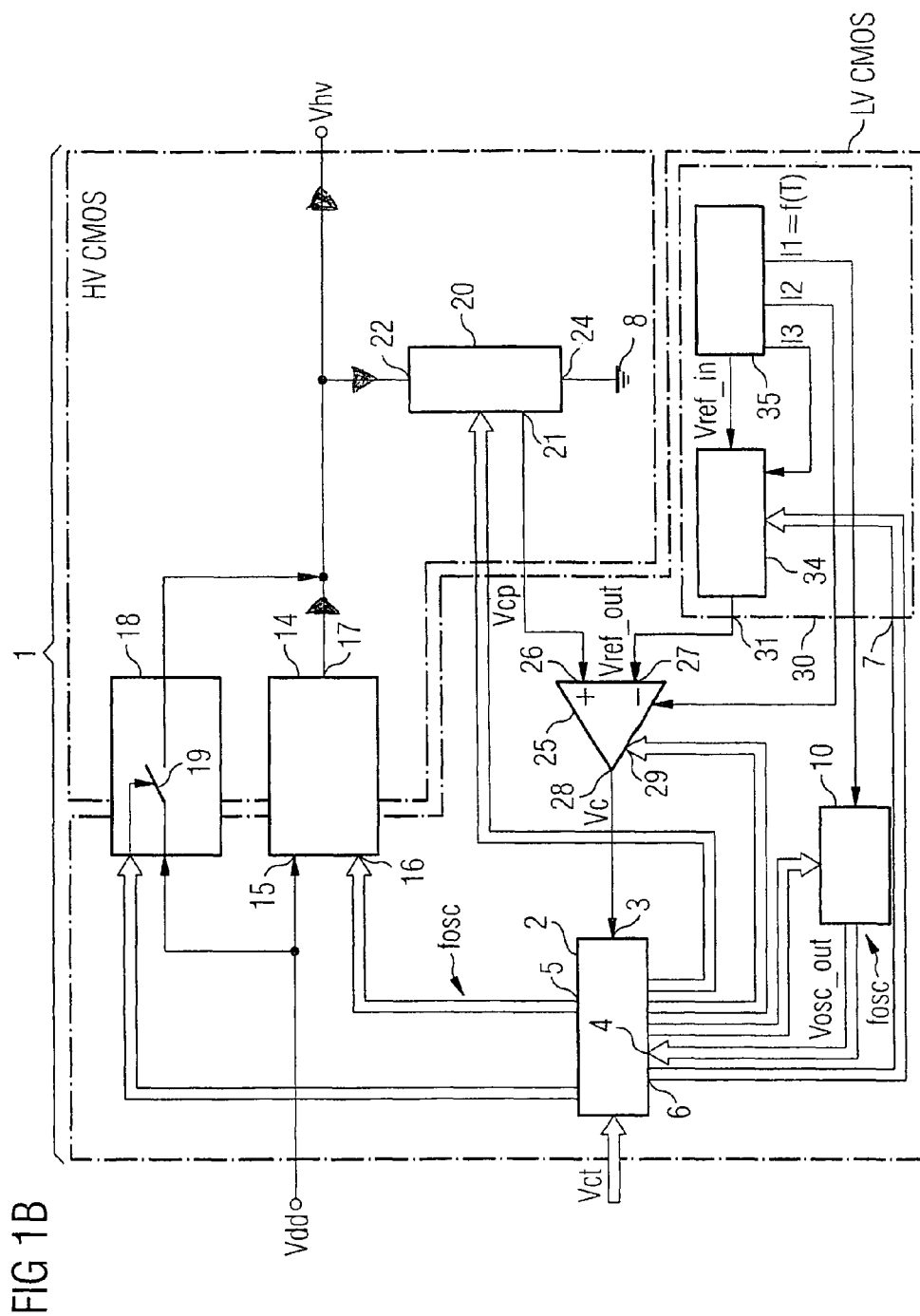

FIG. 1B illustrates an alternative example of a circuit arrangement for the provision of voltage. In contrast to the circuit arrangement according to FIG. 1A, the control arrangement 2 is connected to the charge pump 14 in the circuit arrangement 1 according to FIG. 1B. For this purpose, the first output 5 of the control arrangement 2 is connected to the second input 16 of the charge pump 14. The output of the oscillator 10 is connected to a second input 4 of the control arrangement 2. The input of the oscillator 10 can be connected to a further output of the control arrangement.

The oscillator signal Vosc_out provided by the oscillator 10 is passed to the second input 4 of the control arrangement 2. Depending on the comparator signal Vc and on the external control signal Vct, the control arrangement 2 passes the oscillator signal Vosc_out to the charge pump 14. According to the circuit arrangement in FIG. 1B, the oscillator 10 can remain in operation throughout the operation of the circuit arrangement, and is not switched off in order to deactivate the charge pump 14.

Figure 2:
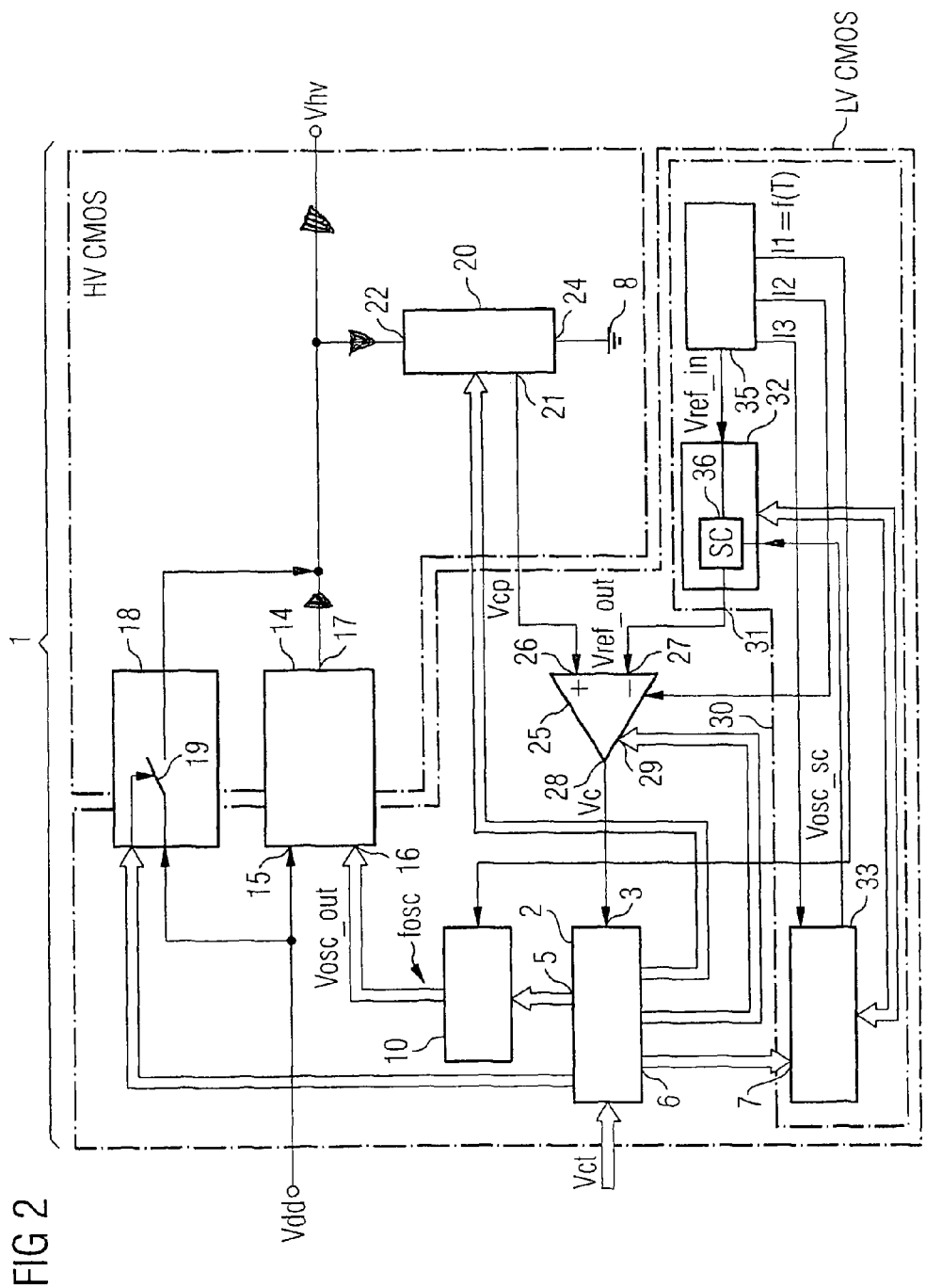
FIG. 2 illustrates an example of a circuit arrangement for the supply of voltage having a switched-capacitor circuit.

FIG. 2 illustrates an example of an embodiment of a circuit arrangement for the supply of voltage, in which the ramp signal generator 30 has a drive oscillator 33, a low-pass filter 32 and the bandgap circuit 35.

An output 6 of the control arrangement 2 is connected to the input 7 of the ramp signal generator 30. The drive oscillator 33 is connected to the input 7 of the ramp signal generator 30. The output of the drive oscillator 33 is connected to the low-pass filter 32. The output of the bandgap circuit 35 is connected to a further input of the low-pass filter 32. The output of the low-pass filter 32 is connected through the output 31 of the ramp signal generator 32 to the inverting input 27 of the comparator 25. The low-pass filter 32 comprises a switched-capacitor circuit 36, the input of which is coupled to the drive oscillator 33 and the bandgap circuit 35, and the output of which is coupled to the output 31 of the ramp signal generator 30. The bandgap circuit 35 is connected to the drive oscillator 33.

Depending on a signal from the control arrangement 2, the drive oscillator 33 provides a drive signal Vosc_sc that is fed to the low-pass filter 32. The reference voltage Vref_in exhibits an approximately rectangular waveform. Because the switched capacitor circuit 36 is designed for filtering with a low-pass characteristic, the low-pass filter 32 is used for filtering the reference voltage Vref_in, providing the reference output voltage Vref_out, with an adjustable rate of rise, at its output. The drive signal Vosc_sc has the purpose of providing the clock signal for the switched-capacitor circuit 36.

The low-pass characteristic of the switched-capacitor circuit 36, and therefore the rate of rise of the output voltage Vhv, can thus favourably be adjusted by means of the drive oscillator 33.

Figure 3:
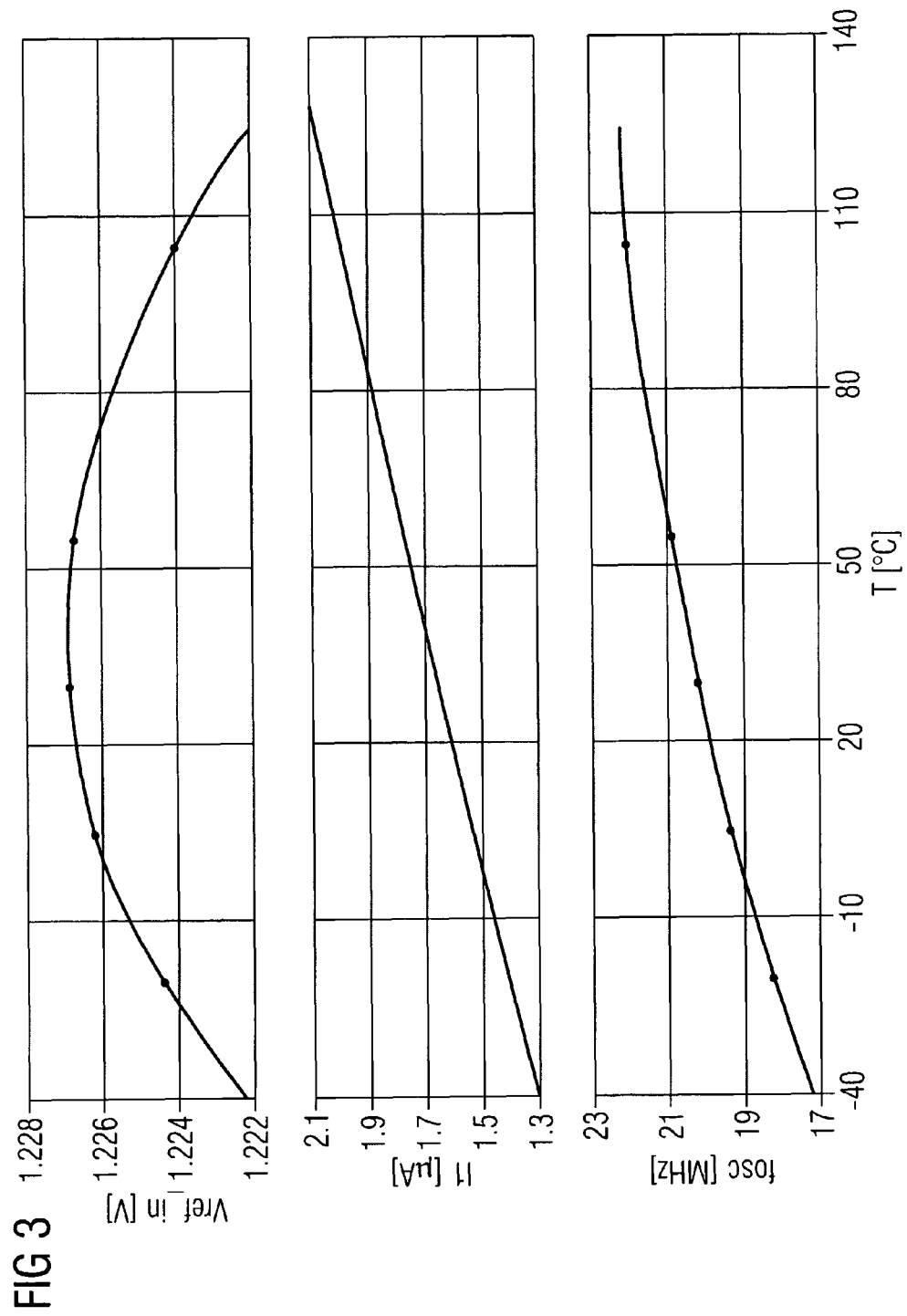
FIG. 3 illustrates examples of signal curves for a reference voltage, a first current, and an oscillator frequency that depends upon temperature.

FIG. 3 illustrates the reference voltage Vref_in, the first current I1 and the oscillator frequency fosc in relation to the temperature T, as they can occur in the circuit arrangement according to FIGS. 1A, 1B and 2.

The temperature T is that of a semiconductor chip on which the circuit arrangement 1 for the supply of voltage is built. Because the temperature T is determined by the bandgap circuit 35, it corresponds to the temperature of the semiconductor chip at the site of the bandgap circuit 35. The temperature depends both on the power consumption of the components on the semiconductor chip, and on the ambient temperature.

The reference output voltage Vref_out only has a slight temperature-dependency; in one example of an embodiment, it is less than 100 ppm.

The first current I1 and the frequency Vosc of the oscillator 10 both increase with rising temperature. The oscillator 10 thus favourably generates a higher oscillator frequency fosc when, because of the higher temperature T of the semiconductor chip, an electrical load that may be coupled to the circuit arrangement 1 requires a higher power. A load of this kind could be a non-volatile memory component.

Figure 4:
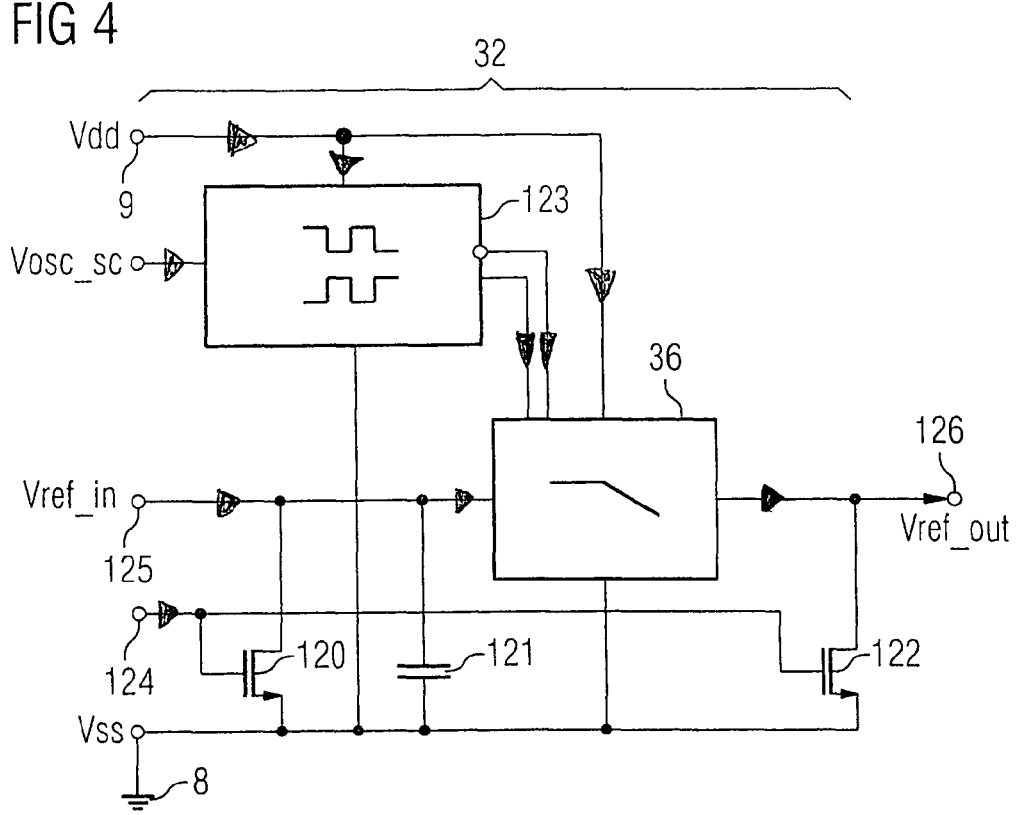
FIG. 4 illustrates an example of a low-pass filter incorporating a switched-capacitor circuit.

FIG. 4 illustrates an example of an embodiment of a low-pass filter 32 with a switched-capacitor circuit 36, as might be used in a ramp signal generator 30 according to the circuit arrangement 1 in FIG. 2.

The low-pass filter 32 comprises the switched-capacitor circuit 36, a clock generator 123, two transistors 120 and 122, and a capacitor 121. The input of the clock generator 123 is connected to the drive oscillator 33. The output of the clock generator 123 is connected over two lines to the switched-capacitor circuit 36. A control input 124 of the low-pass filter 32 is connected to a control terminal of the transistor 120 and to a control terminal of transistor 122. One input 125, that is connected to the bandgap circuit 35, and through which the reference voltage Vref_in is supplied to the low-pass filter 32, is connected to one input of the switched-capacitor circuit 36, as well as to a first terminal of the transistor 120 and to a first electrode of the capacitor 121. A first terminal of transistor 122 is connected to an output of the switched-capacitor circuit 36. The output of the switched-capacitor circuit 36 is connected to the output 31 of the ramp signal generator 30. A second terminal of the transistor 120, a second electrode of the capacitor 121, and a second terminal of the transistor 122 are connected to the reference potential terminal 8. The clock generator 123 and the switched-capacitor circuit 36 are connected between the supply terminal 9 to which the power supply voltage Vdd can be supplied to the low-pass filter 32, and the reference potential terminal 8.

The clock generator 123 sets the switch positions in the switched-capacitor circuit 36 by means of the two lines, in accordance with the drive signal Vosc_sc that is supplied to its input. The switched-capacitor circuit 36 is provided for low-pass filtering of the reference voltage Vref_in, and for provision of the reference output voltage Vref_out as a filtered signal. The reference voltage Vref_in can, in one embodiment, have an approximately rectangular waveform. The reference voltage Vref_in is smoothed by the capacitor 121. The capacitor 121 functions as a voltage stabilizer, and is provided in order to suppress interfering pulses from the switched-capacitor circuit 36 on the bandgap circuit 35. The reference output voltage Vref_out can be accessed at an output 126 of the switched-capacitor circuit 36, and thereby of the low-pass filter 32.

The two transistors, 120 and 122, are provided in order to short-circuit the capacitor 121 as well as the capacitors contained in the switched-capacitor 36, at the input as well as the output, so that, depending on a signal at the control input 124, the reference output voltage Vref_out can be set to zero volts. Following a discharge of this type, and in the presence of a reference voltage Vref_in, the switched-capacitor circuit 36 will cause the low-pass filter 32, and thereby the ramp signal generator 30, to generate a reference output voltage Vref_out with an adjustable rate of rise.

The rate of rise of the reference output voltage Vref_out can favourably be adjusted by means of the drive signal Vosc_sc. The low-pass characteristic of the switched-capacitor circuit 36 can favourably be adjusted by means of a frequency of the drive signal Vosc_sc. In this way, the rate of rise of the output voltage Vhv can also be adjusted.

In one embodiment, the switched-capacitor circuit 36 comprises a capacitor, not illustrated, that is charged and discharged in response to the drive signal Vosc_sc. A limit frequency for the low-pass filter 32 can be a function of the capacitance of the capacitor and of the frequency of the drive signal Vosc_sc. The value of the capacitance, and thereby the area required by the capacitor, can favourably be kept small, as the low-pass characteristic of the switched-capacitor circuit 36 is not only a function of the capacitance value of the capacitor, but also of the frequency of the drive signal Vosc_sc. The frequency of the drive signal Vosc_sc can be adjustable.

Figure 5:
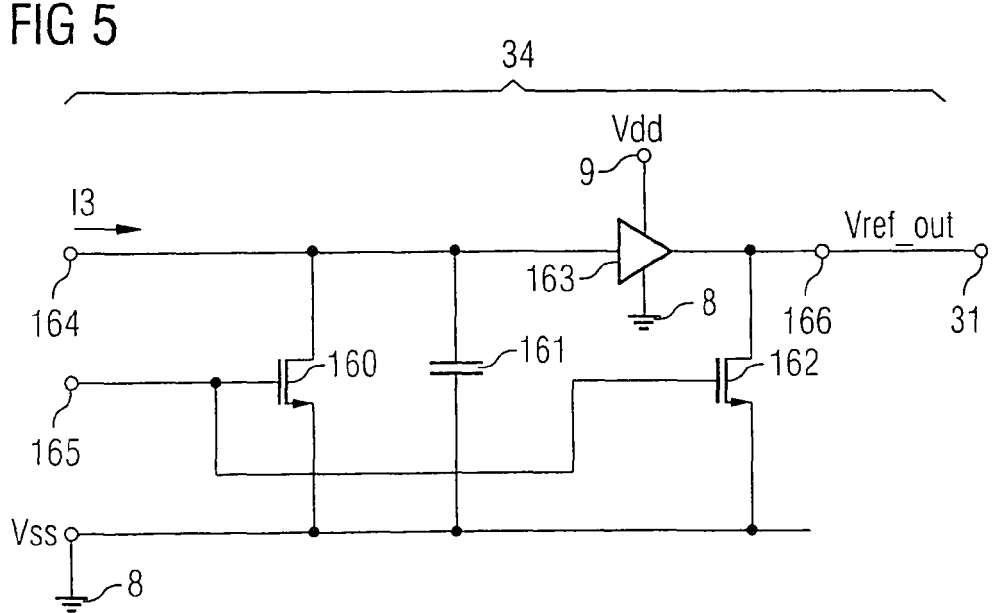
FIG. 5 illustrates an example of an integrator.

FIG. 5 illustrates an example of embodiment of an integrator 34, as may be applied in a circuit arrangement 1 according to FIGS. 1A and 1B.

The integrator 34 comprises two transistors, 160 and 162, a capacitor 161 and a buffer 163. A first terminal of the transistor 160, a first electrode of the capacitor 161, and the input of the buffer 163 are connected to an input 164 of the integrator 34. The output of the buffer 163 is connected to a first terminal of the transistor 162 and to an output 166 of the integrator 34, which is connected to the output 31 of the ramp signal generator. A second terminal of the transistor 160, a second electrode of the capacitor 161, and a second terminal of the transistor 162 are connected to the reference potential connection 8. The buffer is connected between the power supply terminal 9 for provision of the power supply voltage Vdd and the reference potential terminal 8. A control input 165 of the integrator 34 is connected to a control terminal of the transistor 160 and to a control terminal of transistor 162.

The third current I3 is supplied to the integrator 34 through its input 164, and charges capacitor 161. Because of the approximately constant value of the third current I3, the voltage across the capacitor 161 rises almost linearly. This voltage across the capacitor 161 is passed, by means of buffer 163, as the reference output voltage Vref_out to the output 166 of the integrator 34, and therefore to the output 31 of the ramp signal generator 30. But the purpose of buffer 163 is to access the voltage across capacitor 161 while drawing almost no current. The capacitor 161, and the capacitors that are present in the buffer 163 at its input and output, can be discharged through the two transistors 160 and 162.

A signal at the control input 165 thus favourably sets the reference output voltage Vref_out to zero volts. The reference output voltage Vref_out favourably undergoes a linear rise if the third current I3 is constant.

As an alternative, the integrator 34 can have an operational amplifier, with an output that is coupled to an inverting input through a capacitor.

Figure 6:
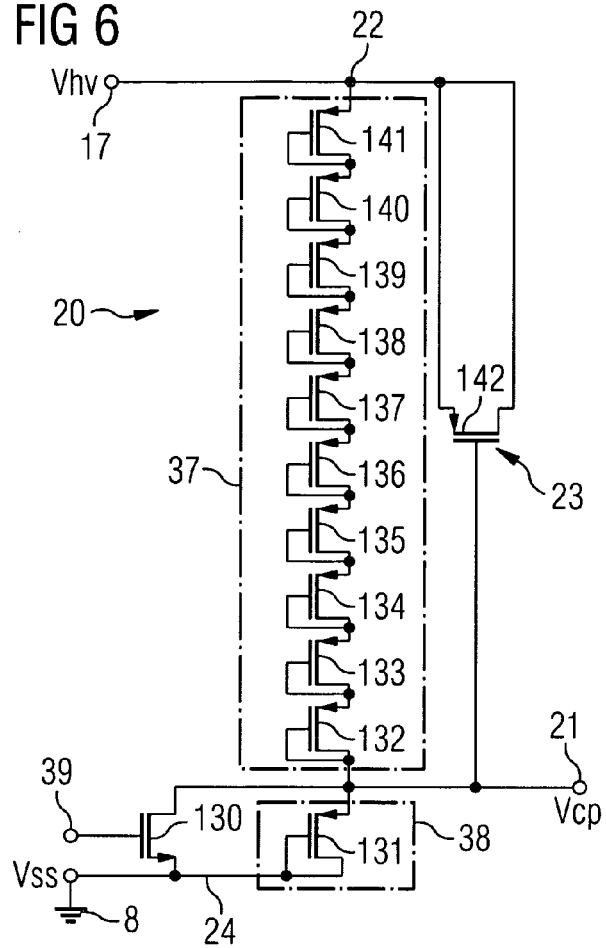
FIG. 6 illustrates an example of a voltage divider.

FIG. 6 illustrates an example of an embodiment of a voltage divider 20, as can be used in the circuit arrangements 1 according to FIGS. 1A, 1B and 2.

The voltage divider 20 comprises a first resistor 37 connected between a first terminal 22 and a tap 21, as well as a second resistor 38, connected between the tap 21 and a second terminal 24. The first resistor 37 consists of several resistors connected in series. The individual resistors each comprise a transistor wired as a resistor. The first resistor 37 thus comprises 10 transistors, 132 to 141, wired as resistors. The second resistor 38 also consists of a transistor 131 wired as a resistor. The transistors 131 to 141 exhibit almost identical current/voltage characteristics, and therefore have approximately the same value of resistance. The voltage divider 20 also has a control input 39 that is connected to a control terminal of a transistor 130. The transistor 130 is wired between the tap node 21 and the reference potential terminal 8. The voltage divider 20, furthermore, has a transistor 142 that is wired as a capacitor between the first terminal 22 and the tap node 21.

The transistor 130 is implemented in the form of an n-channel metal-oxide semiconductor field-effect transistor, while transistors 131 to 141 are implemented as high-voltage p-channel metal-oxide semiconductor field-effect transistors. Transistor 142 is implemented as a high-voltage p-channel metal-oxide semiconductor field-effect transistor.

The first terminal 22 is connected to the output 17 of the charge pump 14 in order to supply the output voltage Vhv. The tap 21 makes the divided voltage Vcp available to the first input 26 of the comparator 25. Because of the number of transistors in the resistors 37 and 38, the divided voltage Vcp in this example embodiment of the voltage divider 20 is one eleventh of the output voltage Vhv. The purpose of transistor 130 is to drop the divided voltage Vcp to zero volts. Transistor 142 provides AC coupling between the output 17 of the charge pump 14 and the tap node 21. If the output voltage Vhv rises very fast, transistor 142 pulls the divided voltage Vcp up very quickly too. Due to the coupling, the divided voltage Vcp rises quickly, and the charge pump is switched off if the divided voltage Vcp is larger than the reference output voltage Vref_out.

The voltage divider favourably exhibits a high impedance, so that the current drawn from the charge pump is kept small, allowing the circuit arrangement 1 to operate efficiently. Transistor 130 can favourably set off the divided voltage Vcp to zero volts, in order to provide defined starting conditions. Transistor 142 favourably reduces the lag in the control system, so avoiding an undesirably fast rate of rise in the output voltage Vhv.

Figure 7:
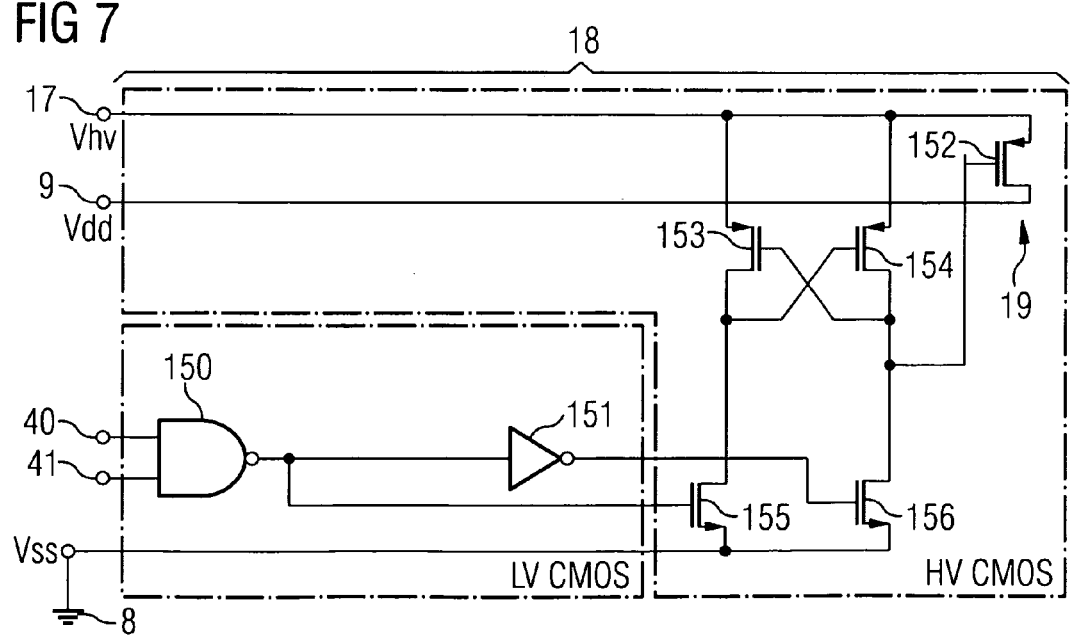
FIG. 7 illustrates an example of a bypass circuit.

FIG. 7 illustrates an example of an embodiment of a bypass circuit 18, as can be used in the circuit arrangements 1 according to FIGS. 1A, 1B and 2.

The bypass circuit 18 comprises a NAND gate 150, an inverter 151, a switch 19 and four transistors, 153 to 156. The switch 19 comprises a transistor 152 connected between the output 17 of the charge pump 14 and the power supply terminal 9. Between the output 17 of the charge pump 14 and the reference potential terminal 8 there is a series circuit comprising transistors 153 and 155. A second series circuit, comprising transistors 154 and 156 is also connected between the output 17 and the reference potential terminal 8. A control terminal of the transistor 153 is connected to a tap between the transistors 154 and 156, as well as with a control terminal of transistor 152. A control terminal of the transistor 154 is connected to a tap between the two transistors 153 and 155.

Two control inputs, 40 and 41, are connected to the two inputs of the NAND gate 150. An output of the NAND gate 150 is connected to a control terminal of the transistor 155 and, through inverter 151, to a control terminal of transistor 156. Transistor 152 is implemented as a high-voltage p-channel metal-oxide semiconductor field-effect transistor. Transistors 153 to 156 are also implemented as high-voltage metal-oxide semiconductor field-effect transistors, the two transistors 153 and 154 being p-channel field-effect transistors, while the two transistors 155 and 156 are re-channel field-effect transistors.

The switch 19, and thereby the transistor 152, feeds the power supply voltage Vdd that is present at the power supply terminal 9 to the output 17 of the charge pump 14. A control signal for the transistor 152 is formed by means of the four transistors 153 to 156.

In this way, the switch 19, whose terminals can be at a high potential, is favourably switched into a conducting or into a non-conducting state by means of the four transistors 153 to 156, in accordance with the signals at the control inputs 40 and 41.

Figure 8:
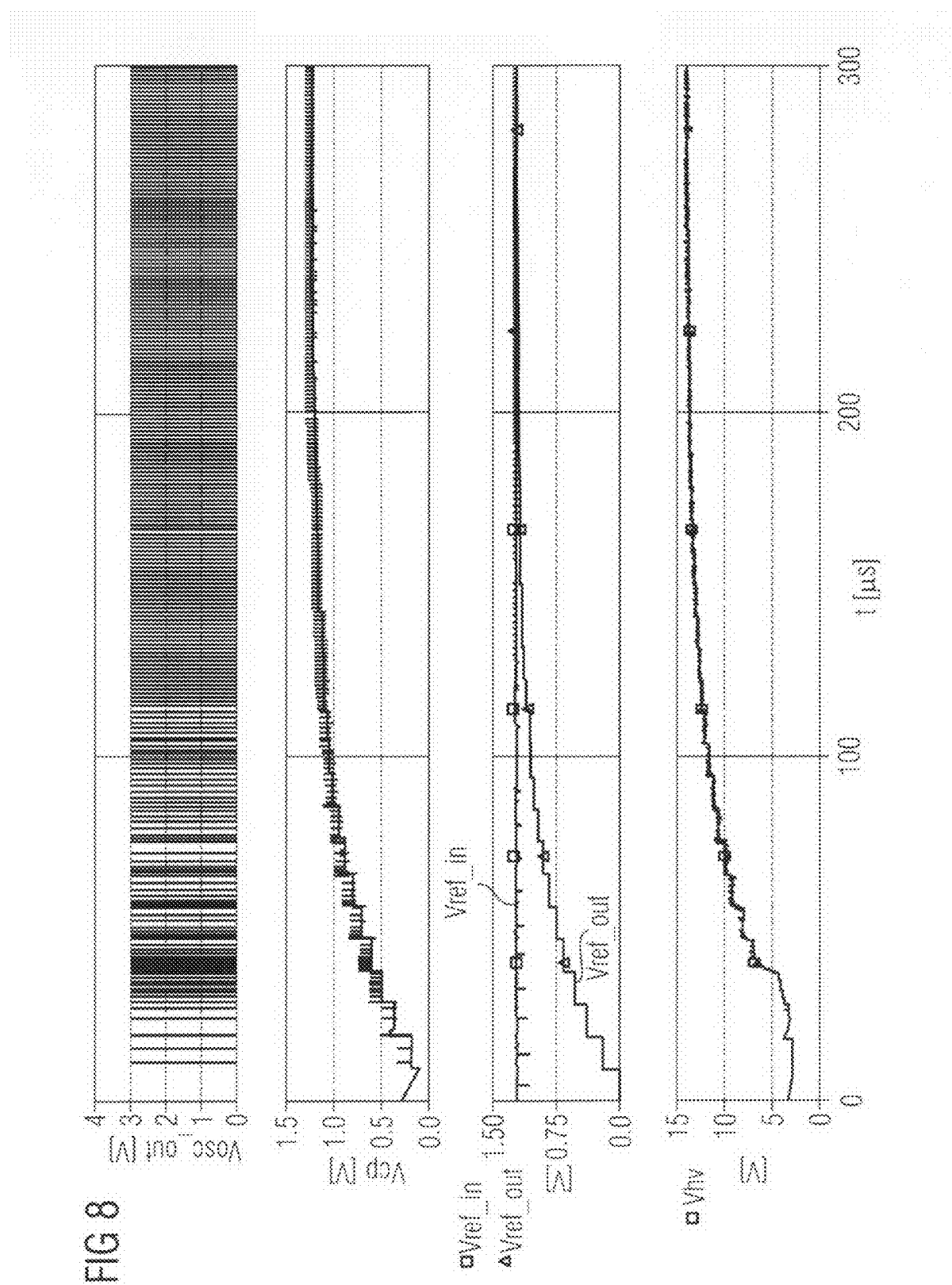
FIG. 8 illustrates examples of the signal curves for an oscillator signal, a divided voltage, a reference voltage, a reference output voltage, and an output voltage in relation to time.

FIG. 8 illustrates an example of the curves for the oscillator signal Vosc_out, the divided voltage Vcp, the reference output voltage Vref_out, the reference voltage Vref_in and the output voltage Vhv against time T. Signal curves of this type may be found in circuit arrangements 1 according to FIGS. 1A and 2.

After the charge pump 14 has been switched on by means of the control arrangement 2, the reference voltage Vref_in rapidly rises to its final value, where it remains. The reference output voltage Vref_out rises slowly, in accordance with the function of the ramp signal generator 30, and approaches the value of the reference voltage Vref_in.

At the beginning, the oscillator 10, and therefore the charge pump 14, are switched on, so that the output voltage Vhv begins to rise. The oscillator 10 remains switched on as long as the divided voltage Vcp remains below the value of the reference output voltage Vref_out. As soon as the divided voltage Vcp reaches the value of the reference output voltage Vref_out, the oscillator 10 is switched off. If the divided voltage Vcp later falls below the value of the reference output voltage Vref_out, the oscillator 10 is switched on again, and the output voltage Vhv begins to rise.

In this example of the waveforms, the output voltage Vhv reaches its maximum value after 300 microseconds. The output voltage Vhv can thus favourably be used to program and delete memory cells in non-volatile memory components.

Figure 9:
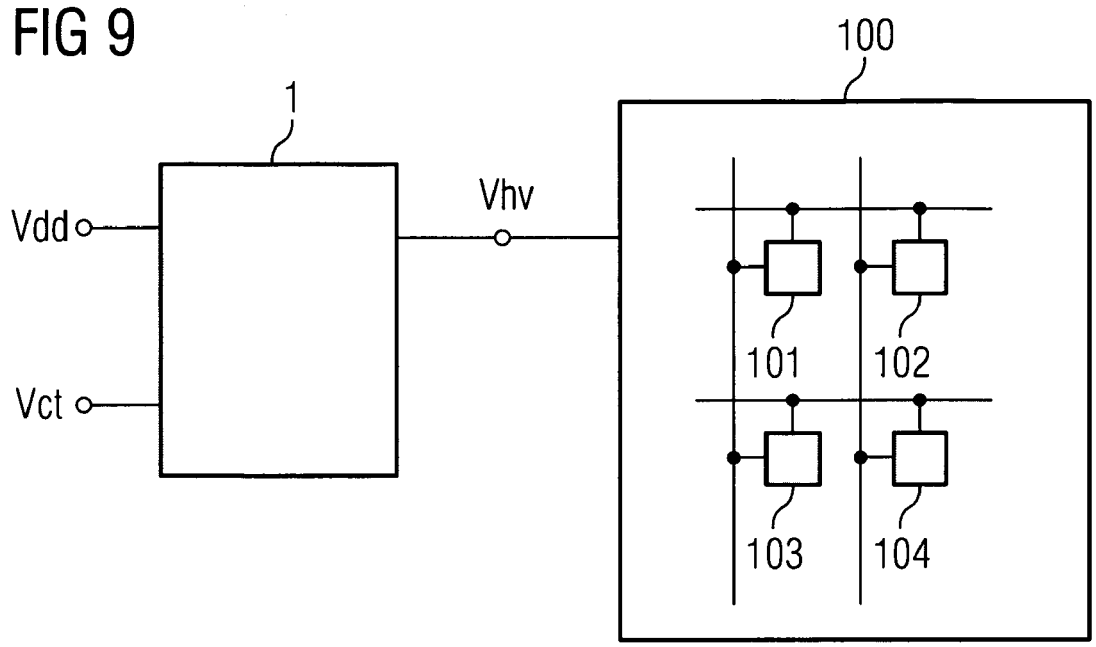
FIG. 9 illustrates an example of a memory arrangement with the circuit arrangement for the supply of voltage.

FIG. 9 illustrates an example of a memory arrangement according to the proposed principle, in which the circuit arrangement 1 can be used to supply voltage in accordance with FIG. 1A, 1B or 2. The memory arrangement comprises the circuit arrangement 1 for the supply of voltage, as well as an arrangement 100 with at least one memory cell, 101 to 104.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A circuit arrangement for the supply of voltage, comprising:
   a control arrangement;
   a charge pump to a first input of which a power supply voltage can be supplied, which is coupled at a second input to a first output of the control arrangement, and which comprises an output for the supply of an output voltage;
   a comparator, coupled at a first input to the output of the charge pump, comprising an output that delivers a comparator signal, wherein the output of the comparator is coupled to a first input of the control arrangement; and
   a ramp signal generator, the input of which is coupled to a second output of the control arrangement, and an output of which is coupled to a second input of the comparator in order to supply a reference output voltage, the ramp signal generator comprising:
      a low-pass filter that is connected upstream to the output of the ramp signal generator, the low-pass filter comprising a switched-capacitor circuit with a low-pass characteristic, and
      a bandgap circuit that is coupled via the low-pass filter to the output of the ramp signal generator; and
   an oscillator connected between the first output of the control arrangement and the charge pump, configured so that it can be switched off, and adapted to supply an oscillator signal to the charge pump.

2. A circuit arrangement according to claim 1, wherein the ramp signal generator is adapted to provide a reference output voltage with a magnitude that rises over time.

3. A circuit arrangement according to claim 1, wherein the ramp signal generator comprises a drive oscillator that is provided in order to supply a drive signal to the low-pass filter to operate the switched-capacitor circuit.

4. The circuit arrangement according to claim 1, wherein the oscillator is adapted to supply an oscillator signal with a rising oscillator frequency as the temperature rises.

5. A circuit arrangement according to claim 1, wherein an output of the bandgap circuit is coupled to the oscillator to supply a temperature-dependent signal.

6. A circuit arrangement according to claim 1, wherein circuit arrangement comprises a voltage divider that is connected between the output of the charge pump and a reference potential terminal, and which is coupled at a tap node to the first input of the comparator in order to supply a divided voltage.

7. A circuit arrangement according to claim 6, wherein the voltage divider comprises transistors wired as resistors.

8. A circuit arrangement according to claim 6, wherein the voltage divider comprises a capacitor that is connected between a first terminal of the voltage divider and the output of the voltage divider.

9. A circuit arrangement according to claim 8, wherein the capacitor comprises a transistor wired as a capacitor.

10. A circuit arrangement according to claim 1, wherein the circuit arrangement comprises a bypass circuit that is connected between the first input and the output of the charge pump and which, in a bypass mode of operation, serves to deliver the power supply voltage as the output voltage.

11. A circuit arrangement according to claim 10, wherein the bypass circuit comprises a switch that is connected between the first input and the output of the charge pump.

12. A memory arrangement comprising the circuit arrangement for the supply of voltage according to claim 1, and an arrangement having at least one memory cell.

13. A method for the operation of a circuit arrangement for the supply of voltage, comprising the steps of:
- increasing a reference output voltage in the form of a ramp function, wherein the reference output voltage is generated through low-pass filtering of a reference voltage by means of a switched-capacitor circuit, and wherein the reference voltage can be tapped at an output of a bandgap circuit;
- providing a divided voltage by dividing the output voltage from a charge pump;
- comparing the divided voltage to the reference output voltage; and
- activating the charge pump if the magnitude of the divided voltage is smaller than the magnitude of the reference output voltage, and deactivating the charge pump if the magnitude of the divided voltage is larger than or equal to the magnitude of the reference output voltage;
- wherein, depending on a comparison between the divided voltage and the reference output voltage, a comparator signal is generated,
- wherein depending on the comparator signal a first control signal is generated and fed to the oscillator,
- wherein depending on the first control signal the oscillator, which can be switched off, provides an oscillator signal at its output and, in accordance with the pulses in the oscillator signal, the charge pump generates the output voltage.

* * * * *